United States Patent
Stauffer et al.

[19]

[11] Patent Number: 5,913,566
[45] Date of Patent: Jun. 22, 1999

[54] COMBINE CAB ROOF

[75] Inventors: David B. Stauffer, New Holland, Pa.; Russell W. Strong, Craftsbury Common, Vt.

[73] Assignee: New Holland North America, Inc., New Holland, Pa.

[21] Appl. No.: 08/926,001

[22] Filed: Sep. 9, 1997

Related U.S. Application Data

[60] Provisional application No. 60/030,498, Nov. 12, 1996.

[51] Int. Cl.$^6$ ........................................................ B60J 7/00
[52] U.S. Cl. ........................ 296/190.1; 296/210; 296/214
[58] Field of Search ........................ 296/190.01, 190.08, 296/190.09, 190.1, 208, 214, 190.03, 210; 362/493; 454/108, 137

[56] References Cited

U.S. PATENT DOCUMENTS

| | | | |
|---|---|---|---|
| D. 317,011 | 5/1991 | Boddin et al. ............................. | D15/30 |
| 3,868,896 | 3/1975 | Doll et al. ................................ | 454/137 |
| 4,140,047 | 2/1979 | Bowman et al. ......................... | 98/2.11 |
| 4,184,712 | 1/1980 | Skahill ................................ | 296/190.03 |
| 4,185,867 | 1/1980 | Schmidt et al. ........................ | 296/187 |
| 4,503,749 | 3/1985 | Kuhn et al. .............................. | 98/2.11 |
| 4,660,462 | 4/1987 | Thompson et al. ...................... | 98/2.11 |
| 4,721,031 | 1/1988 | Nakata et al. ....................... | 454/137 X |
| 5,311,411 | 5/1994 | Garolfi ................................... | 362/493 |
| 5,388,884 | 2/1995 | Keehner et al. .................... | 296/190.03 |
| 5,688,022 | 11/1997 | Adams et al. .......................... | 296/214 |
| 5,695,238 | 12/1997 | Calamari et al. ....................... | 296/210 |

FOREIGN PATENT DOCUMENTS

| | | | |
|---|---|---|---|
| 003619077 A1 | 12/1986 | Germany ........................... | 296/190.09 |
| 2134464 | 8/1984 | United Kingdom ................... | 296/214 |
| 2220392 | 1/1990 | United Kingdom ................... | 296/214 |

*Primary Examiner*—D. Glenn Dayoan
*Assistant Examiner*—Chad D. Wells
*Attorney, Agent, or Firm*—J. William Stader; Larry W. Miller; Frank A. Seemar

[57] ABSTRACT

The disclosure relates to a cab roof for an agricultural combine. The invention consists of an outer roof. Affixed within the outer roof is a left inner roof, right inner roof and a headliner. The left inner roof contains a fresh air duct with a fresh air inlet for the heating, ventilation and air conditioning (HVAC) unit. The left inner roof also has three light pockets. Each pocket contains either a distance or flood light fixture. Each light pocket also contains a light shroud having a top lip and an elongated bottom lip. The elongated bottom lip prevents light from reflecting off the cab glass. The right inner roof is similarly designed. The headliner contains a pair of molded conditioned air ducts for smoothly transferring conditioned air to several side defrost vents and several front defrost vents. A mirror support bar passes through the left inner roof, headliner and right inner roof. The entire roof is secured to the cab by several bolts. The entire cab can be moved by replacing the bolts with removal bolts. A worker can assemble the roof components at 'bench-level' without having to climb on top of the cab.

16 Claims, 5 Drawing Sheets

COMBINE CAB ROOF

The application claims benefit of provisional application 60/030,498 filed Nov. 12, 1996.

BACKGROUND OF INVENTION

1. Field of Art

This invention relates to the improvement of an agricultural combine. More specifically it relates to an improvement of the cab roof of an agricultural combine.

2. Description of Prior Art

Mechanical harvesting of grain has taken place for decades. However, efforts continue in the attempt to make harvesting operations more efficient and effective. A combine harvester generally includes a head which cuts the crop. The head then moves the cut crop into a feeder house. The feeder house lifts the cut crop into the threshing and separation areas of the combine. The grain is separated from the stalk by a rotor or threshing system. The grain is then moved and stored in a grain tank. The chaff and trash are deposited from the rear of the combine. An operator usually runs these various operations from a glass-enclosed cab. Typically, the cab is located above and behind the head. Because modem farming operations require that the combine operator be present in the cab for extended periods of time, the effort to improve the cab has been considerable. Conventional cabs are large glass-enclosed structures, usually with two seats. There are a variety of lights for observing the fanning operations during the night. Also in proximity to the cab are several mirrors for viewing the rear and sides of the combine. The placement of lights on a combine represent a great challenge. Due to the vibration created by the various threshing systems, keeping lights and mirrors dampened is difficult. It is also desirable for the operator to easily reach adjustable lights and mirrors. Because of the long hours spent operating the combine, environment control systems have also grown in importance. Most combine cabs have some form of heating, ventilation and air conditioning (HVAC) systems. Some cab designs place the HVAC units in the roof. This location sometimes results in condensation dripping into the cab. Sometimes the unit is placed above or outside the cab. This makes maintenance complicated. It is also difficult to assemble a cab roof. Typically, the interior side of the cab roof is assembled and placed in the cab. After the interior is placed in the cab, a worker must then continue to affix the various electrical components and ducting while standing on ladders outside the cab. This is complicated, tiring, time-consuming and expensive. Frequently, during the life of the combine, if maintenance is required on the cab roof, a worker must either open or remove the cab roof or climb onto the outside of cab. This is either dangerous for the worker or damaging to the seal between the roof and cab.

The prior art illustrates these and other drawbacks. U.S. Pat. No. 4,140,047 discloses a mobile cab with air filter. In order to reach the fresh air filter, a worker must climb outside the cab to a precarious position.

U.S. Pat. No. 4,185,867 discloses a harvester with a laterally extending visor structure. This visor structure is does not permit a worker to easily assemble or maintain any of the systems with the cab.

U.S. Pat. No. 4,503,749 discloses a combine visor with environmental components. This cab roof has a variety of complex cab systems which need to be installed after the roof is place on the cab. This places the assembler in the awkward position of installing equipment into the ceiling while standing in the cab. This increases the time, complexity and expense of construction. Furthermore, it is difficult to remove and attach the cab during assembly.

U.S. Pat. No. 4,660,462 discloses a ventilation system and filter. Again, the complexity HVAC system increases the time and cost to install the system. The blowers located in the roof of the cab will require that the assembler wait until after the roof is attached to the cab before starting to work. Further maintenance is accomplished from the top of the cab roof.

Consequently, the need exists for a cab roof which is easy to assemble and which allows a worker to build the roof at a 'workbench' level instead of standing in a vehicle cab or on ladders outside the cab.

OBJECTS OF THE INVENTION

It is an object of the present invention to provide an improved combine cab roof.

It is a further object of the present invention to provide a combine cab roof which allows an assembler or maintenance worker to reach equipment either at a workbench level or easily from within the cab.

It is a further object of the present invention to provide a cab roof which minimizes the need for removal from the cab so as to extend the life of the seal between the cab roof and cab.

It is a further object of the present invention to provide a flood wing extended away from the cab so as to shield the cab from the sun.

It is a further object of the present invention to provide a flood wing which is reinforced by a mirror support bar.

It is a further object of the present invention to provide a cab roof which has conditioned air ducts attached to the headliner.

It is a further object of the present invention to provide a cab roof having a light pocket in which different light fixtures can be placed to assist in the viewing of farm operations.

It is a further object of the present invention to provide a cab which may be moved by replacing a conventional bolt with a special removal bolt.

It is a further object of the present invention to provide a cab roof for which various electrical, HVAC and commnunications systems can be maintained from inside the cab.

It is a further object of the present invention to provide a cab roof which allows for the future installation of a high intensity discharge lighting transformer.

It is a further object of the present invention to provide a cab roof with duct work which has a conditioned air duct that minimizes the turbulence needed to circulate air.

It is a further object of the present invention to provide a cab roof which has a fresh air inlet located at the side of the cab to limit the amount of dirty air entering the HVAC system.

SUMMARY OF THE INVENTION

The invention overcomes the deficiencies of the prior art. The invention is a combine cab roof comprising an outer roof into which a headliner, right inner roof and left inner roof are affixed. The left inner roof contains a fresh air duct with a fresh air inlet positioned close to the cab door. The left inner roof has a flood wing with an inner, center and outer pocket. Each pocket contains either a distance or flood light fixture. The pocket has a light shroud having a top lip and an elongated bottom lip. The elongated bottom lip prevents light from reflecting back onto the cab glass. The headliner has two molded conditioned air ducts for distributing conditioned air from the heat, ventilation and air conditioning (HVAC) system to operator vents and several side defrost vents and a front defrost vent. The right inner roof is attached to the outer roof and also has three light pockets. The right inner roof also has an area for placing a high intensity discharge lighting (HIDL) transformer in the future. A mirror support bar supports the rear view side mirrors and passes through the left inner roof and right inner roof. The roof is secured to the cab by four conventional bolts. Four removal bolts can replace the conventional bolts and may be used to lift the entire cab. A worker can assemble the headliner and inner roofs into the outer roof while the outer roof is at 'bench-level' and upside down. All major elements can be reached from inside the cab obviating the need for worker to climb onto the roof or similarly dangerous position.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION OF THE INVENTION

Figure 1:
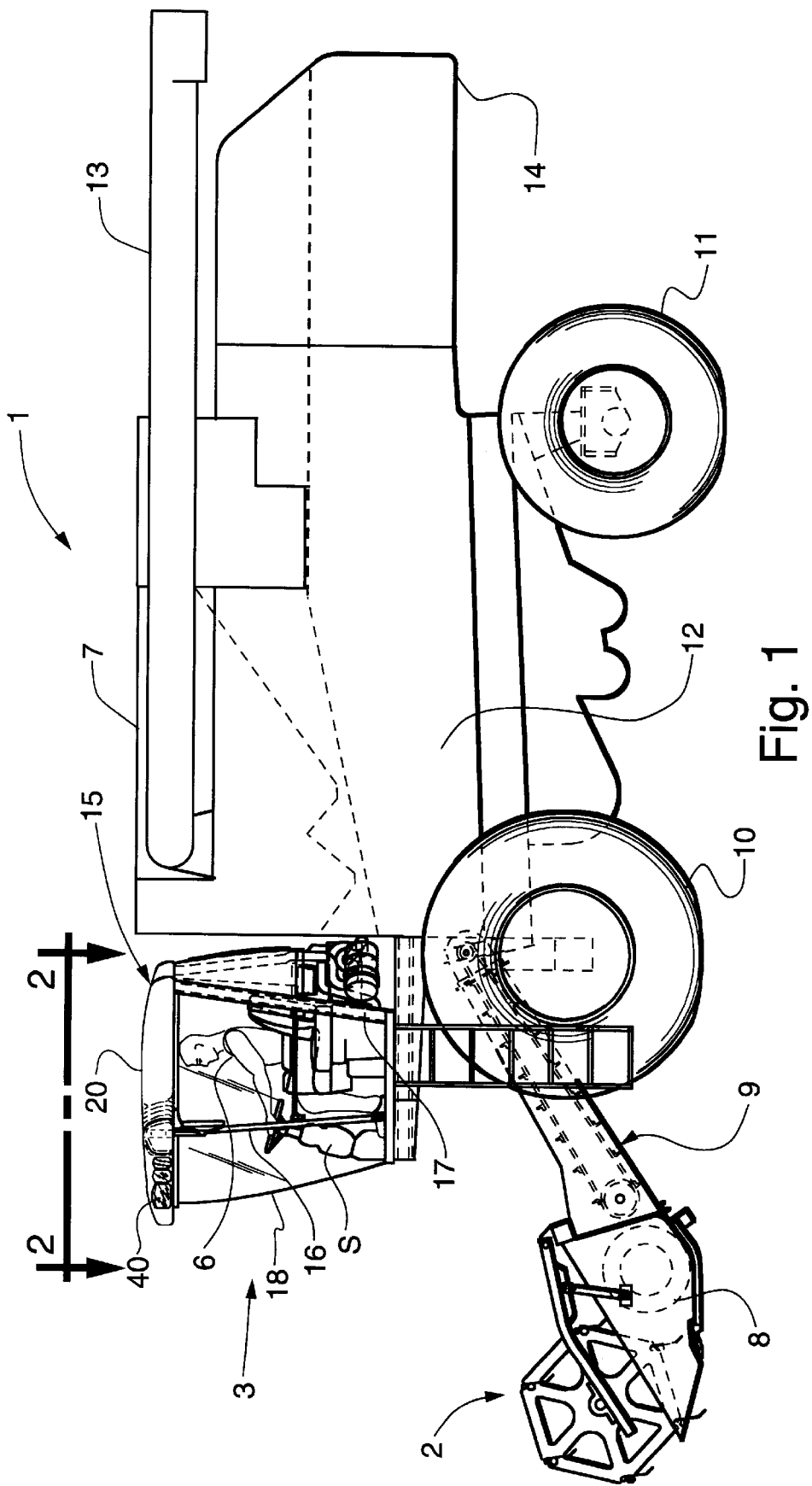
FIG. 1 is a elevational view of an agricultural combine.

Referring to the drawings, it is possible to observe the major elements and general operation of the present invention. Left and right references are used as a matter of convenience and are determined by standing at the rear of the combine and facing the forward end in the normal direction of travel. Likewise, forward and rearward are determined by normal direction of travel of the combine. Upward or downward orientations are relative to the ground or operating surface. Horizontal or vertical planes are also relative to ground.

FIG. 1 illustrates a conventional combine 1 having a pair of front wheels 10 (only one shown) and a pair of rear wheels 11 (only one shown) for providing movement over the ground. At the front of the combine is a header 2 for cutting a crop. As the combine 1 and header 2 are moved forward, the grain and stalk are cut by the header. The header moves the grain into an auger trough. A transverse auger 8 pushes the grain and stalk in the auger trough to the center of the header. Located at the center of the header is the feeder house 9 or elevator. The feeder house 9 moves the grain and stalks rearward into the threshing and separation systems 12 of the combine. After processing and separation, the processed grain is stored in a grain tank 7 located near the top of the combine. The grain is removed from the grain tank by an unloading auger 13. The trash or chaff is ejected from the rear 14 of the combine. The operator 6 runs the combine 1 from the cab 3 located behind the header 2 and at the front of the combine. From the cab the operator can observe most the various combine functions. The cab 3 usually has a large glass window or several windows which afford the operator 6 the maximum visibility to monitor the header 2. Located in the center of the cab 3 is the steering column 5. Behind the steering column 5 is an operator's chair. The present invention or cab roof 15 covers the cab 3.

The present invention generally consists of an outer roof 20 and an inner roof 30. The inner roof has a left flood wing 38, right flood wing 39 and a headliner 50. Several light fixtures 43 or 44 are located within the flood wings 38 or 39. Rear view mirrors 71 are also affixed to the roof.

Figure 2:
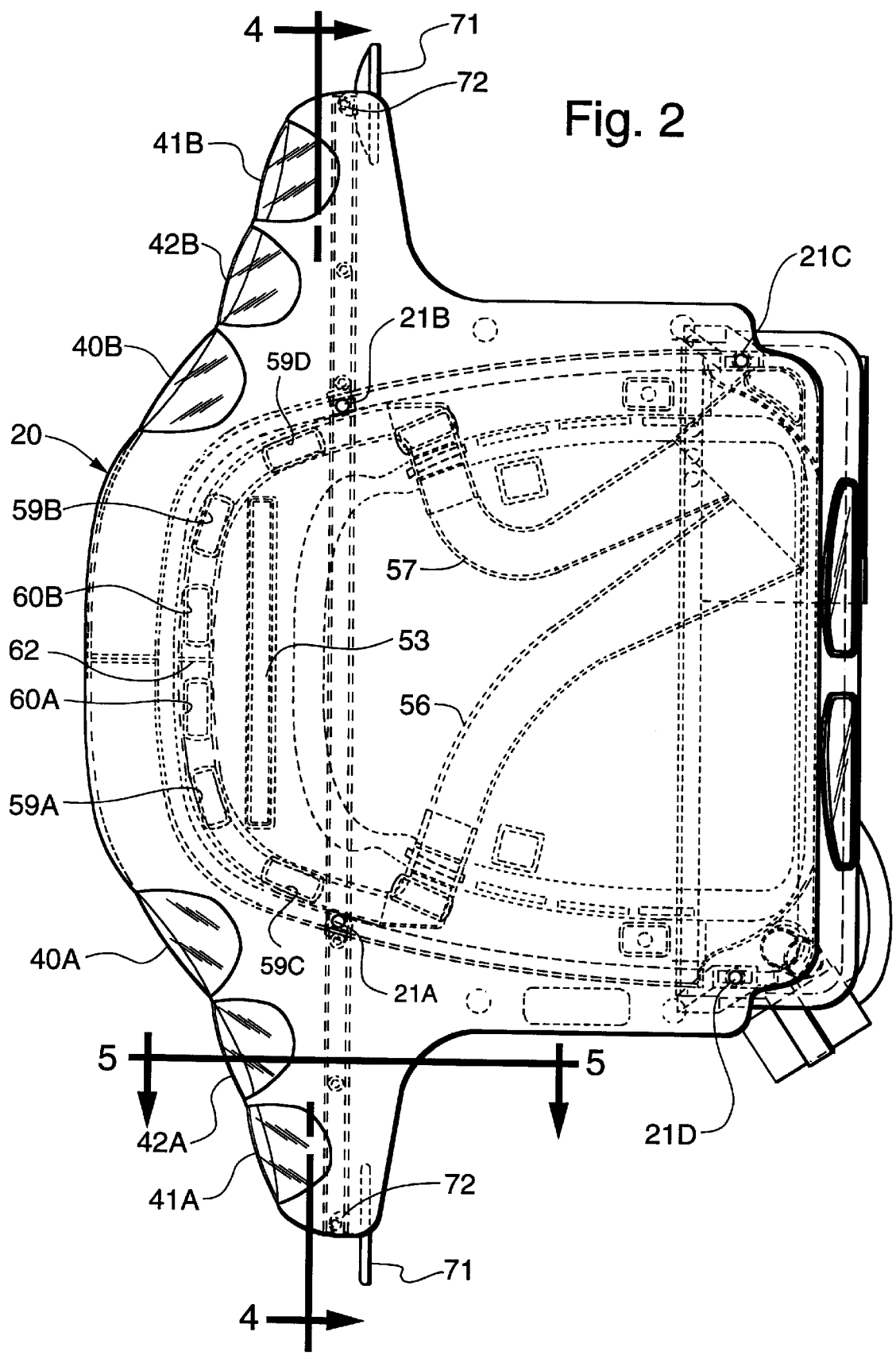
FIG. 2 is a plan view of the cab taken on line 2—2 of FIG. 1.

The outer roof 20, as seen in FIG. 2, is generally contoured to match the shape of the cab. There are four outer bolt apertures in the roof—21A, 21B, 21C and 21D. These outer bolt apertures align with the cab posts. Outer bolt apertures 21A and 21B align with the front cab or cab 'A' posts. Outer bolt apertures 21C and 21D align with the rear cab or cab 'B' posts. Also visible in FIG. 2 are the various light pockets 40, 41, and 42. These will be discussed in greater detail later. The outer roof extends horizontally away from the cab windshields. This enables the roof to shade the cab glass from the sunlight. It is also possible to insert channels (not shown) on the outer roof 20 to drain rain water away from the cab.

Figure 3:
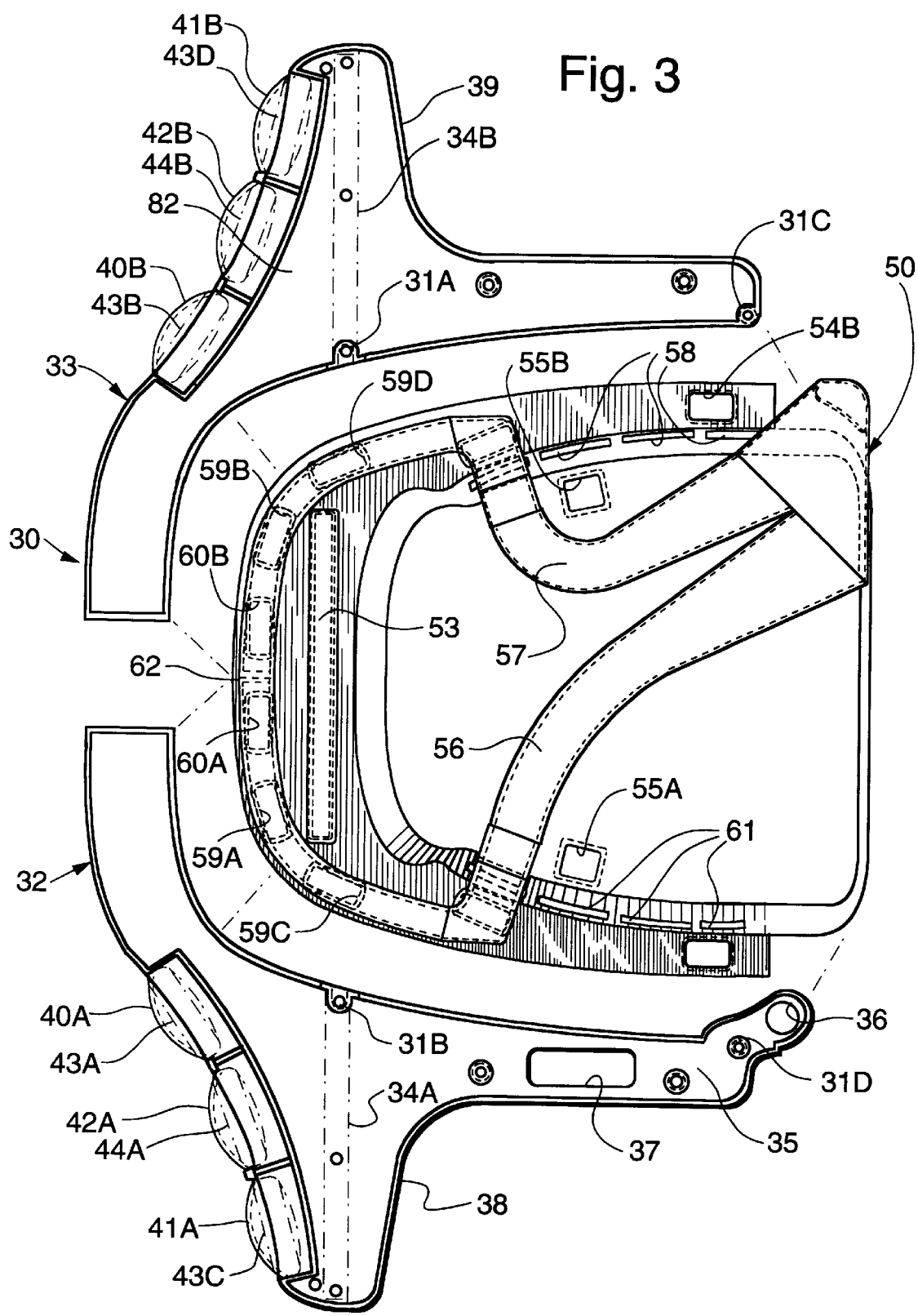
FIG. 3 is an exploded view of the headliner and inner roof with the outer roof removed.

The inner roof 30 can be seen in FIG. 3 and in phantom in portions of FIG. 2. There are three parts to the inner roof—the right inner roof 33, the left inner roof 32 and the headliner 50. All three parts of the inner roof are affixed to the outer roof before the entire roof is attached to the cab. This allows the assembler to work at 'bench level' instead of the top of the roof.

Figure 4:
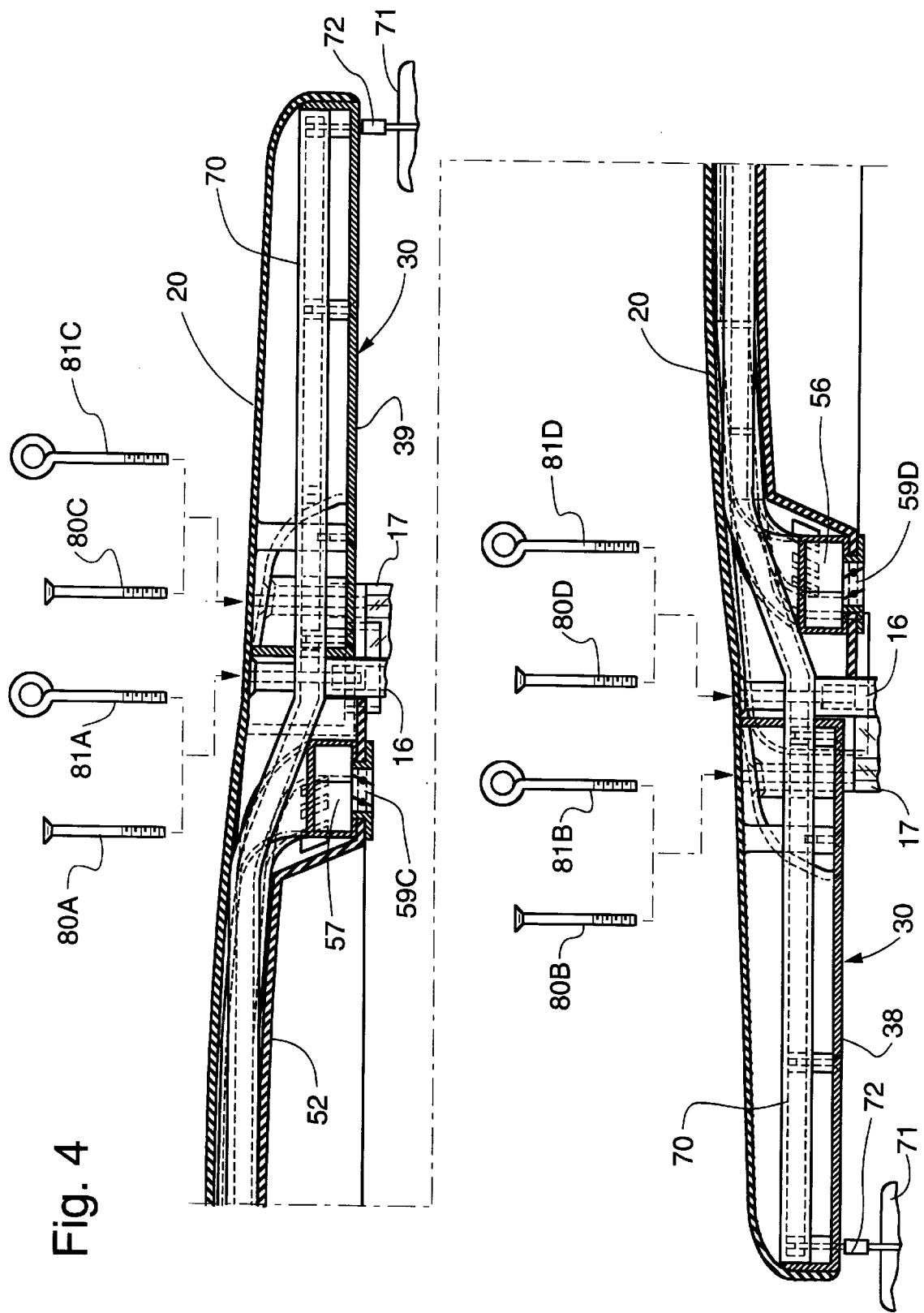
FIG. 4 is an enlarged sectional view through the assembled cab roof taken on line 4—4 of FIG. 2.
Figure 5:
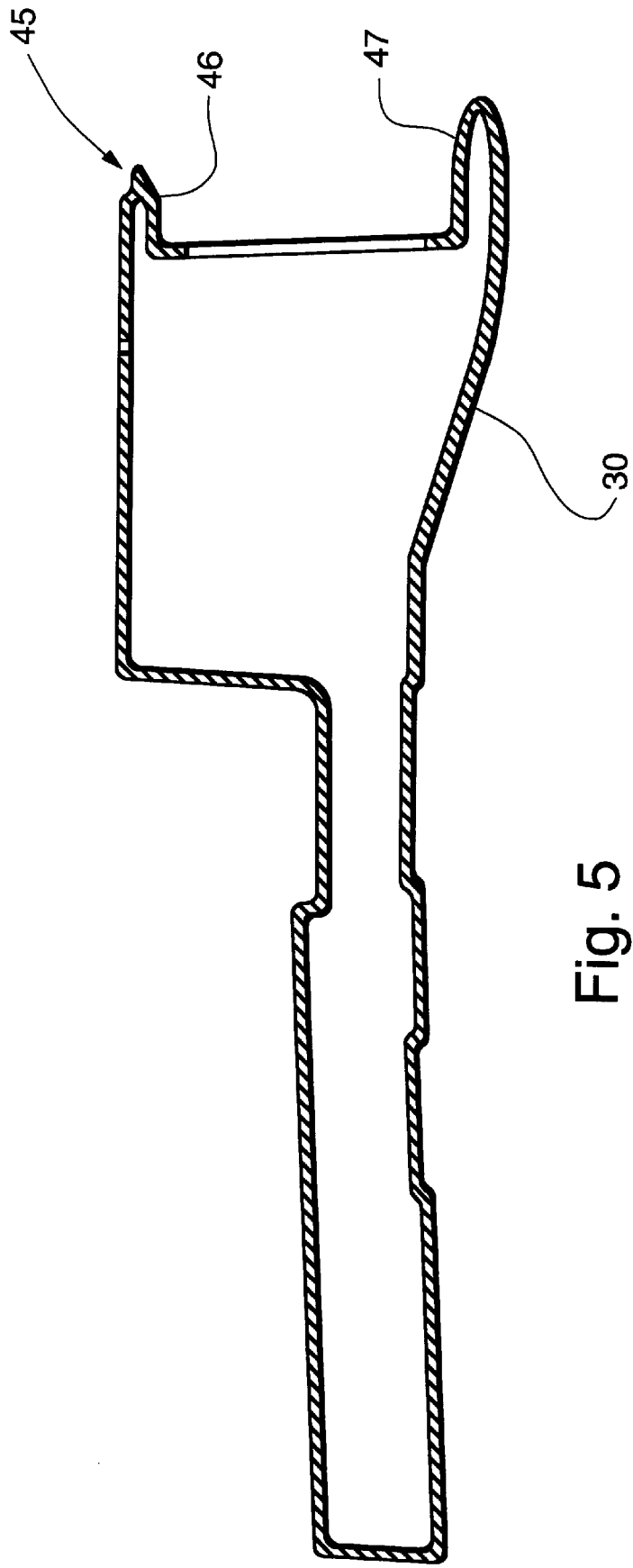
FIG. 5 is an enlarged sectional view through the left flood wing taken on line 5—5 of FIG. 2.

The left inner roof 32 has a left flood wing 38 and a fresh air duct 35. A quantity of fresh air enters the fresh air duct 35 through the fresh air inlet 37. The air then passes to the fresh air plenum 36. The air plenum 36 is a circular tube running vertically down the rear cab wall and is connected to the heat, ventilation and air conditioning (HVAC) system (not shown). The fresh air inlet is located on the side of the cab near the cab door. This minimizes the amount of dust entering the HVAC system. Inlets located at the front of the roof are prone to receive more dust. The left flood wing 38 extends away from the cab and headliner. The left flood wing 38 has three light pockets—the inner light pocket 40A, the center light pocket 42A and the outer light pocket 41A. Each light pocket has a light fixture and a light shroud. The inner light pocket 40A and outer light pocket 41A have flood lights 43A and 43C. These flood lights are oriented such as to illuminate various working areas. The outer light pocket 41A and flood light 43C illuminates the header and area immediately in front of the header. The inner light pocket 40A and flood light 43A illuminates towards the outer edge of header. The center light pocket 42A and distance light 44A illuminates the region in front of the combine. As illustrated in FIG. 5, each light pocket contains a light shroud 45 having a top lip 46 and an elongated bottom lip 47. The elongated bottom lip 47 acts to prevent light from shining into the cab. The left inner roof 32 and left flood wing 38 have a mirror support duct 34A containing the mirror support bar 70 (shown in FIG. 4 and in phantom in FIG. 3). The mirror support bar 70 has the mirror support 72 attached at the end of the bar 70. The mirror 71 is attached to the bar 70 by the mirror support 72. An alternative embodiment replaces the mirror support bar 70 with a region of reinforced fiber glass embedded into the outer roof 20. The mirror support bar 70 acts to dampen any motion in flood wing 39. The left inner roof 32 also has a pair of inner bolt apertures 31B and 31D which align with the outer bolt apertures 21B and 21D and the cab posts. As illustrated in FIG. 4, a bolt 80B or 80D is normally secured to the cab post 16 or 17. The bolt 80B or 80D can be replaced by a removal bolt 81B or 81D. The removal bolt is inserted into the cab roof and cab posts. This permits the cab to be easily lifted and moved.

The right inner roof 33 is largely identical to the left inner roof 32 and left flood wing 38. The major difference between these two sections is the lack of a fresh air duct 35 in the right inner roof 33. The right inner roof 33 also has a region into which a high intensity discharge lighting (HIDL) transformer 82 can be placed. In the event that a user decides to use this form of lighting in both the left and right flood wings, the transformer can be placed in this region. Presently, the right inner roof 33 has the same light pockets (inner 40B, center 42B and outer 41B) as the left inner roof 32. The flood light fixtures (43B and 43D) are located in the inner light pocket 40B and outer light pocket 41B, respectively. The right inner roof 33 also has a mirror support duct 34B and inner bolt apertures 31A and 31C.

Between the left inner roof 32 and right inner roof 33 is the headliner 50. The headliner 50 consists of a front headliner 52 and rear headliner 51 with a seam at 52A. The front headliner 52 and rear headliner 51 form a rectangular visor opening 53. The rear headliner 51 has a molded right conditioned air duct 57 and molded left conditioned air duct 56 glued to the headliner and positioned between the headliner and outer roof 20. Unlike convention conditioned air ducting, the present invention does not deposit all of the conditioned air into a single plenum for distribution. Instead, the present invention possesses two ducts by which the conditioned air may be channelled in the cab. It is advantageous to allow for several ducts instead of a single plenum with several vents because it minimizes the turbulence of the conditioned air caused by large single plenum. Less air turbulence results in less energy needed to distribute the conditioned air to the cab. The right conditioned air duct 56 delivers a quantity of conditioned air to two side defrost vents 59A and 59C and to several front defrost vents 60A. Similarly, the left conditioned air duct 57 delivers a quantity of conditioned air to two side defrost vents 59B and 59D and to several front defrost vents 60B. A divider 62 is positioned between the two front vents 60A and 60B. The rear headliner 51 also has several additional openings for various equipment and lights. There are openings for the dome lights 55A and 55B and ambient lights 54A and 54B. There are openings for the communication controls 61 and the electrical controls 58. It is also possible to mold the condition air duct directly into the outer roof.

As indicated earlier, to assemble the combine cab roof, the outer roof is placed at 'bench-level' and upside down. The inner roof comprising the headliner, left inner roof and right inner roof are affixed to the outer roof. Various components such as, visor, vents, seals, lights, various communications devices and electrical controls are installed. Then, the roof is flipped over and placed on the cab. The removal bolts are inserted into the roof and cab posts. The entire cab is lifted onto the combine by the removal bolts. Once the cab is attached to the combine, the removal bolts are replaced with conventional bolts. The windshield wiper motor can be installed through the visor opening 53. Any periodic maintenance is accomplished from within the cab minimizing the need to remove the cab roof. Constant removal of the cab roof could, over time, damage the seal between the roof and the cab. This could possibly allow averse elements into the cab.

It will be obvious to those skilled in the art hat various changes may be made without depart from the scope of the invention and the invention is not to be considered limited to what is illustrated in the drawings and described in the specification.

What is claimed is:

1. A combine cab roof comprising:
   a. an outer roof;
   b. an inner roof affixed to the outer roof, said inner roof having a headliner, a left inner roof and a right inner roof, said left inner roof having a left flood wing, said right inner roof having a right flood wing opposing said left flood wing, each wing extending away from the headliner;
   c. each flood wing having an inner light pocket, a center light pocket and an outer light pocket, each pocket containing a light fixture, each light pocket containing a light shroud having a top lip and an elongated bottom lip, whereby a quantity of light emitted by the light fixture is blocked by the elongated bottom lip; and
   d. said left inner roof having fresh air inlet positioned proximate to a cab door, whereby a quantity of fresh air is received to a cab, said combine cab roof further comprising a mirror support bar extending through the left flood wing, the headliner and right flood wing, said support bar having a pair of opposing mirror supports and mirror, whereby the mirror support bar provides support to the flood wings and dampens motion to said flood wings.

2. The combine cab roof described in claim 1, wherein the headliner further comprises a visor opening therein, said headliner further comprising an ambient light opening therein, a dome light opening therein, an electrical control opening therein, and a communication opening therein.

3. The combine cab roof described in claim 2, wherein the headliner has a molded left conditioned air duct and a molded right conditioned air duct, said duct positioned between the front headliner and the outer roof.

4. The combine cab roof described in claim 3, wherein said conditioned air ducts provide a quantity of conditioned air to a side defrost vent and to a front defrost vent.

5. The combine cab roof described in claim 4, wherein the outer roof and the inner roof are affixed to a pair of front cab posts and a pair of rear cab posts by a threaded bolt.

6. The combine cab roof described in claim 5, wherein said threaded bolt may be removed and a removal bolt may be inserted into the pair of front cab posts and the pair of rear cab posts, whereby the cab can be moved.

7. The combine cab roof described in claim 6, wherein a flood light is inserted into the inner light pocket, a distance light fixture is inserted into the center light pocket and a flood light is inserted into the outer light pocket.

8. The combine cab roof described in claim 7, wherein the right flood wing has a high intensity discharge lighting region.

9. The combine cab roof described in claim 8, wherein said headliner and inner roof are assembled in the outer roof before the cab combine roof is affixed to the pair of front cab posts and the pair of rear cab posts.

10. The combine cab roof described in claim 9, wherein left wing has only three lighting pockets, and the right wing has only three lighting pockets.

11. In a combine harvester, said combine having a header operationally connected to a threshing and separating system, a glass-enclosed cab for observing said header, said cab having a pair of front posts and a pair of rear post, affixed to said cab is a roof, said roof having a light fixture attached thereto, an improved roof comprising:
   a. an outer roof;
   b. an inner roof affixed to the outer roof, said inner roof having a headliner said headliner surrounded by an opposing left inner roof and right inner roof, said left inner roof having a left flood wing and a right flood wing; and c. said headliner having a rear headliner and front headliner with a visor opening, said headliner further comprising an ambient light opening therein, a dome light opening therein, an electrical control opening therein a defrost vent therein, and a communication opening therein.

12. The improvement described in claim 11 wherein the left flood wing and right flood wing each have an outer light pocket containing a flood light fixture, a center light pocket containing a distance light fixture and an inner light pocket containing a flood light fixture.

13. The improvement described in claim 12 wherein the outer light pocket, center light pocket and inner light pocket each has a light shroud comprising a top lip and an elongated bottom lip.

14. The improvement described in claim 13, wherein said headliner further comprises a molded left conditioned air duct and a molded right conditioned air duct, said ducts positioned between the headliner and the outer roof, said ducts communicating a quantity of conditioned air to the defrost vent.

15. The improvement described in claim 16, wherein the inner roof and the outer roof are affixed to the pair of front posts and the pair of rear posts by a threaded bolt, said threaded bolt may be replaced by a removal bolt to allow the cab to be moved.

16. The improvement described in claim 15, wherein the inner roof further comprises a fresh air inlet positioned proximate to a cab door, whereby a quantity of fresh air is received to the cab.

\* \* \* \* \*